United States Patent [19]

Kisters et al.

[11] 4,229,411
[45] Oct. 21, 1980

[54] PROCESS AND APPARATUS FOR THE ABSORPTIVE REMOVAL OF POLLUTANTS FROM WASTE GASES

[75] Inventors: Theodor Kisters; Alfred Vogler, both of Krefeld, Fed. Rep. of Germany

[73] Assignee: Babcock-BSH Aktiengesellschaft vormals Büttner-Schilde-Haas AG, Krefeld-Uerdingen, Fed. Rep. of Germany

[21] Appl. No.: 28,927

[22] Filed: Apr. 10, 1979

Related U.S. Application Data

[62] Division of Ser. No. 939,373, Sep. 5, 1978.

[30] Foreign Application Priority Data

Sep. 2, 1977 [DE] Fed. Rep. of Germany ....... 2739509

[51] Int. Cl.$^3$ .................... G01N 21/00; G05D 7/00; G05D 23/00; B01D 50/00
[52] U.S. Cl. ......................... 422/62; 55/20; 55/106; 55/122; 55/126; 55/210; 55/270; 422/109; 422/111; 422/169; 422/207; 422/234; 423/242
[58] Field of Search ............ 422/62, 109–111, 422/168–173; 423/242 A; 55/8, 20, 22, 106, 120, 122, 126, 210, 228, 257 R, 270, DIG. 34

[56] References Cited

U.S. PATENT DOCUMENTS

| | | | |
|---|---|---|---|
| 2,895,800 | 7/1959 | Otto | 422/168 X |
| 3,958,961 | 5/1976 | Bakke | 55/126 X |
| 3,989,465 | 11/1976 | Onnen | 422/110 |
| 4,006,066 | 2/1977 | Sparwald | 422/168 X |
| 4,019,444 | 4/1977 | Kleeberg | 422/169 |
| 4,164,547 | 8/1979 | Simko | 422/111 X |

Primary Examiner—Michael S. Marcus
Attorney, Agent, or Firm—Michael J. Striker

[57] ABSTRACT

Waste gases are purged by adding to the gas while it flows through an absorber a neutralizing agent together with water and then subjecting the gas to cooling so as to evaporate the added liquid. The adsorption then results in a reaction with the neutralizing agent whereby dry salts are formed which are removed from the process. The temperature of the waste gas is automatically and continuously measured and the volume of the water is adjusted automatically and continuously in accordance with the temperature measurements. The amount of waste gases is furthermore automatically and continuously measured, preferably at several places of the process, and the amount of neutralizing agent is continuously and automatically adjusted to the latter measurements so as to obtain always the stoichiometric equivalent for the reaction with the pollutants.

7 Claims, 2 Drawing Figures

PROCESS AND APPARATUS FOR THE ABSORPTIVE REMOVAL OF POLLUTANTS FROM WASTE GASES

This is a division of Ser. No. 939,373, filed Sept. 5, 1978.

BACKGROUND OF THE INVENTION

The invention relates to a process for the removal by absorption of noxious compounds from waste gases, particularly gases generated by the combustion of industrial or domestic wastes.

For this purpose several processes are known which either operate with dry or with wet residues.

The wet residue processes require additional purification steps since the waste water formed cannot readily be recycled into the fresh water channel. These processes therefore involve substantial additional apparatus which again increases the cost of the process.

The processes operating with dry residues either apply finely ground absorbents in dry condition to the gas or spray-inject a neutralizing agent together with water into the waste gas flow or establish the contact in some other way.

It is for instance known from German published application No. 25 18 079 to spray-inject a neutralizing agent with water into the waste gas stream and then to subject the gas stream to chilling in order to form dry salts. The volume of the injected water is determined on the basis of the flow rate and the temperature of the waste gas which heats up and causes its evaporation. The concentration of the neutralizing agent in the water is such that the neutralizing agent is present in amounts which at least are equivalent to the stoichiometric amount necessary for reacting with all of the noxious gases.

In view of the continuous changes in operating conditions continuous adjustments are necessary to comply with the specific conditions. These adjustments are costly and are normally effective only with a certain phase lag. An economically optimum and at all times satisfactory absorption of the pollutions is not assured thereby.

It is therefore an object of the present invention to obtain an adjustment of the injected water and of the added neutralizing agent in a continuous manner and without a phase lag and in accordance with the conditions prevailing at any moment of time and thus to obtain a uniform quality of the purified gas while minimizing the amount of necessary neutralizing agent.

SUMMARY OF THE INVENTION

This object is solved in the invention by a continuous and automatic measurement of the concentration of the components in the gas and causing the amount of neutralizing agent to become adjusted automatically and continuously dependent on these measurements of the gas concentration so as to always have present the stoichiometric amount of neutralizing agent in the gas. In a further feature of the invention the temperature of the gas discharged from the absorber is also subjected to a continuous automatic measurement and the amount of recycled water is continuously and automatically adjusted dependent on these temperature measurements so as to add to the gas a temperature-related amount of water in order to keep the temperature in the absorber constant.

Preferably the concentration of pollutants is measured at several places, preferably prior and directly behind the absorber and after discharge from a filter arranged behind the absorber.

The formed dry salt can be passed into the filter and eliminated therein. The chemical reaction which is started in the absorber may continue in the connecting channel from the absorber to the filter and in the filter itself subsequent to discharge of the gas from the absorber.

To assure a perfect liquid spray under all conditions it is preferable not to change the added amount of fresh water. The adjustment rather is obtained by adjusting the water that is recirculated into the water inlet channel or water supply vessel.

Preferably, measuring devices for the gas concentration are provided in several places, for instance in the channel introducing the waste gas to the absorber, in the connecting channel between the absorber and the subsequent filter and in the outlet through which the purified gas is discharged from the filter. All these measuring devices may be connected to a central control arrangement.

The principal acidic pollutants to which the present process applies are sulfur dioxide and halogen acids, such as, hydrogen chloride and hydrogen fluoride. The neutralizing agents are preferably sodium hydorixde and calcium hydroxide.

The process may, however, also be useful to remove carbonic acid ($CO_2$), chlorine and other noxious components from the gases.

The neutralizing agents generally are alkali or alkaline earth oxides or hydroxides, carbonates and bicarbonates, for instance, alkali compounds of sodium, potassium or lithium.

The elimination of the formed salt particles may be effected by a gravity separator or a filter. The latter is preferable as will be discussed below.

The amount of neutralizing agent is supplied from various supply vessels by means of a dosage device which may be connected with a central control device. Preferably, a temperature adjustment device is provided in the connecting channel from the absorber to the subsequent filter, which device controls a valve in the water recycling channel.

The connecting channel between the absorber and the filter may also constitute a further absorption channel.

The addition of neutralizing agents and water to the absorber preferably is effected by separate inlet ducts.

The nozzles for effecting the spray-injection of the water can be distributed in the absorber peripherally in the neighborhood of the waste gas inlet channel, and they may be interconnected by an annular duct. Preferably, the nozzles are arranged peripherally in a manner that the distribution of the spray-injected water corresponds to the flow speed profile of the introduced waste gas.

The nozzles are preferably in the form of two-way nozzles for introducing and recycling the water.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILS OF THE INVENTION AND PREFERRED EMBODIMENTS

Figure 1:
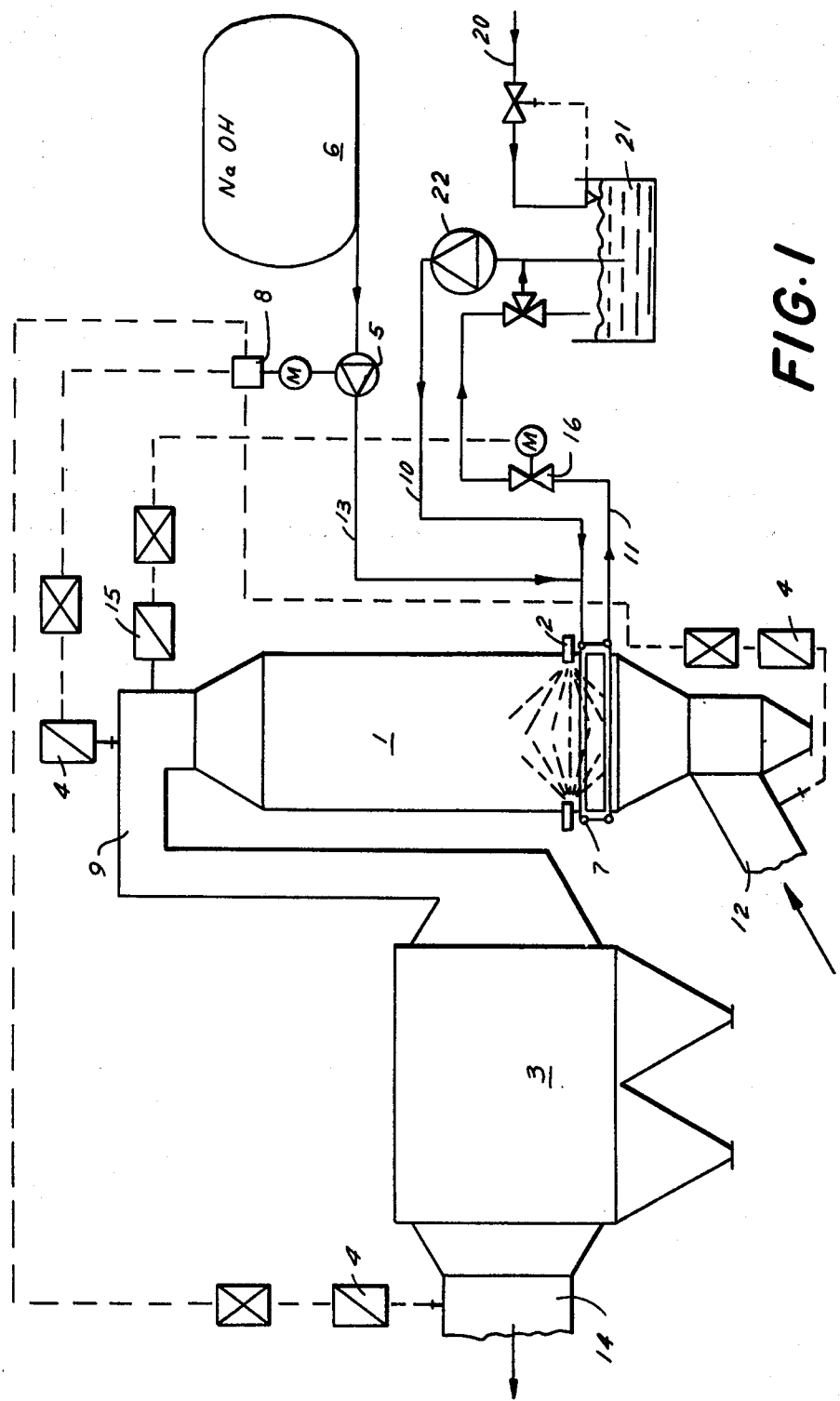
FIG. 1 illustrates, in a diagrammatic manner and partly in the form of a flow sheet, the inventive process and apparatus in which sodium hydroxide is used as the neutralizing agent.

With reference in the first place to FIG. 1 it will be seen that the waste gas is introduced into the absorber 1 through an introductory channel 12. Above this inlet channel there are provided peripherally in the absorber two-way nozzles 2 which are interconnected by an annular duct 7.

Around each nozzle 2 a ring of air currents is formed which prevents interference with the operation by adhesions or excessive temperatures. Instead of the separate recycling channel it is also possible to use two-way nozzles in which the liquid spray is formed by means of compressed air.

The concentration of pollutants is measured by gas analysis apparatus 4 of which are provided: one in the waste gas introductory channel 12, another in the connecting channel 9 from the absorber 1 and a third one in the discharge channel 14 for the purified gas from the electrofilter 3. All these measuring devices are connected to a common central control device 8.

Figure 2:
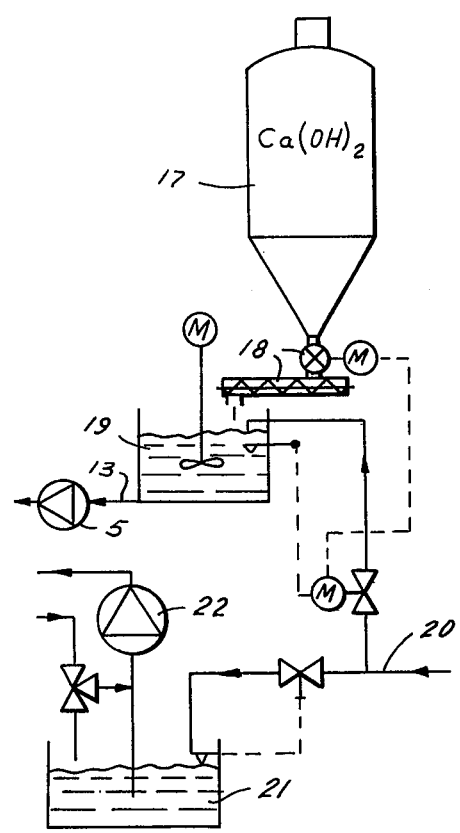
FIG. 2 is a partial view of another embodiment in which milk of lime is used as the neutralizing agent.

As already indicated the neutralizing agent may be sodium hydroxide or milk of lime. As appears from FIG. 1 the sodium hydroxide is obtained from a supply tank 6. FIG. 2 illustrates the use of calcium hydroxide. The lime is disposed in a silo 17 and is passed through suitable distribution and conveyance means 18 to a stirring tank 19 where further water is added to form milk of lime.

The sodium hydroxide or milk of lime is passed into the absorber through the duct 13 from the supply tanks 6 and 19. The injection is effected by means of a dosage pump 5. The regulation of the amount is carried out through the dosage pump depending on the results obtained from the measurements in the gas analyzers 4 and evaluated by the central control device 8, such as a computer.

In the connecting channel 9 a temperature regulator 15 is provided which is connected with a valve 16 disposed in the water recycling duct 11.

For injecting the sodium hydroxide or milk of lime and fresh water into the absorber, a separate alkali inlet 13 and water inlet channel 10 are provided. The fresh water duct is indicated at 20; it leads to a water supply tank 21 from which the inlet channel 10 is fed. This is accomplished by a pump 22. The pump is adjusted to supply a constant amount of liquid from the tank 21.

The regulation of the volume of the injected water accordingly is effected exclusively by means of the water recycling duct 11 by means of the valve 16 which in turn is controlled by the temperature regulator 15. The recycling water can be introduced directly into the inlet channel 10 of the water or into the water supply tank 21.

The absorber 1 as shown in the drawing is a vertical structure and the upwards flowing gas reacts with the sodium hydroxide or milk of lime to form salts which in dry form are passed with the gas through channel 9 into the connected electrofilter 3 where the separation is effected. Chemical reactions started in the absorber may thus continue in the connecting channel 9 and in the electrofilter 3.

The process of the invention and the apparatus for carrying it out permits a speedy automatic adjustment to the conditions existing at any moment of time, principally to the varying concentrations in the gas volume. This assures that even at peak charges of waste gas the desired results are obtained. Besides, the process and apparatus permit minimizing the amount of the sodium hydroxide or milk of lime while at the same time obtaining an optimum absorption of pollutants from the waste gases.

It will be understood that other neutralizing agents may also be used in the process of the invention.

It is also noted that the process in addition to other advantages accomplishes a better conditioning and thus an improved dust separation in the electrofilter.

The measuring device for the concentration of the various pollutants or noxious gases in the waste gas may be in form of a conventional device adapted to measure the continuous changes in the concentration of noxious gases, particularly in case of waste combustion installations since the composition of the waste products of course is subject to great variation. The concentrations of the noxious gases are concurrently measured as indicated above and then further processed by a computer which directly calculates the necessary amount of neutralizing agent which must be introduced into the absorber.

The devices for carrying out these measurements may be conventional gas analysis apparatus, particularly of the type that operates by means of absorption spectrum analysis. In these devices as is commonly known the differential absorption properties of the various noxious gas components are determined relative to ultraviolet or infrared ray absorption.

A device of this kind is for instance on the market under the tradename "EDZ device" and is made by the Philips Corporation of Eindhoven, Holland.

The following example will further illustrate the invention.

EXAMPLE

This example specifically relates to an apparatus for use in connection with a combustion installation for domestic or industrial wastes. The total amount of waste gas introduced into the absorber in this case was 100,000 $Nm^3$ per hour (the term $Nm^3$ as usual designating a normal cubic meter, that is a cubic meter at zero temperature C. and a pressure of 1,000 millibar).

The flue gas temperature of the gas at the point of introduction was 280° C.

The composition of the waste gas included the following components:
HCl: 2,000 $mg/Nm^3$
$SO_2$: 1,000 $mg/Nm^3$
HF: 30 $mg/Nm^3$
flue dust: 10 $g/Nm^3$.

All of these measurements relate to the components in dry condition.

The amount of water injected into the adsorber for the purpose mainly to lower the temperature was 4,488 kg/h. The neutralizing agent in the form of sodium hydroxide was used in an amount of 430 kg/h.

Upon discharge from the apparatus the temperature of the gas had been reduced from 280° C. to 180° C. The total solid contents of the purified gas upon discharge, that is the contents of flue dust plus salts plus alkali carbonates, amounted to a maximum of 100 mg/Nm³ measured again in dry condition.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An apparatus for purging by absorption pollutants from waste gases, which comprises: absorption vessel means; inlet duct means communicating with the bottom of said absorption vessel means; means for passing a dispersion or aqueous suspension or solution of a neutralizing agent and additional fresh water into said absorption vessel means; recycle duct means for recycling condensed or excess water from said absorption vessel means into said passing means; an electrofilter disposed following said absorption vessel means; additional duct means communicating with the top of and connecting said absorption means with said electrofilter; means connected to said inlet duct means, for automatically and continuously measuring the concentration of pollutants in the waste gas and adjusting the amount of neutralizing agent according to the measurements; discharge duct means for the release of purified gas from said electrofilter; means connected to said additional duct means; for automatically and continuously measuring the temperature of the gas discharged from said absorption vessel means, and valve means disposed in said recycle duct means, controlled by said temperature measuring means, so as to adjust the amount of recycled water and thereby maintain a constant temperature in said absorption vessel means.

2. The apparatus of claim 1, wherein separate additional measuring means for the pollutants are provided in said additional duct means and in said discharge duct means, all of said pollutant measuring means being connected to a central control device adapted to adjust the amount of neutralizing agent introduced into said absorption vessel means in accord with the measurements.

3. The apparatus of claim 1, further comprising a dosage pump for the neutralizing agent in said passage means, controlled by said pollutant measuring means.

4. The apparatus of claim 1, wherein separate passage means are provided for the neutralizing agent and the fresh water, the passage means for the fresh water being adapted to inject a constant amount of fresh water into said absorption vessel means.

5. The apparatus of claim 1, further comprising: a plurality of spray nozzles on the end of said passage means inside said absorption means for injection of the neutralizing agent and the fresh water; and an annular duct interconnecting said spray nozzles.

6. The apparatus of claim 5, wherein said spray nozzles are peripherally spaced around said absorption vessel means in a manner to adapt the spray distribution to the flow speed of the waste gas.

7. The apparatus of claim 5, wherein said spray nozzles include two-way nozzles for injecting and recycling the water.

* * * * *